United States Patent
Flynn, Jr. et al.

(10) Patent No.: US 7,613,749 B2
(45) Date of Patent: Nov. 3, 2009

(54) SYSTEM AND METHOD FOR APPLICATION FAULT TOLERANCE AND RECOVERY USING TOPOLOGICALLY REMOTELY LOCATED COMPUTING DEVICES

(75) Inventors: John Thomas Flynn, Jr., Morgan Hill, CA (US); Mihaela Howie, Burlingame, CA (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 11/403,050

(22) Filed: Apr. 12, 2006

(65) Prior Publication Data

US 2007/0244937 A1     Oct. 18, 2007

(51) Int. Cl.
*G06F 12/00* (2006.01)
*G06F 17/30* (2006.01)

(52) U.S. Cl. ........................... 707/204; 707/202
(58) Field of Classification Search ............. 707/204, 707/202
See application file for complete search history.

(56) References Cited

U.S. PATENT DOCUMENTS

| | | | |
|---|---|---|---|
| 4,941,087 A | 7/1990 | Kap | |
| 4,945,474 A | 7/1990 | Elliott et al. | |
| 5,155,678 A | 10/1992 | Fukumoto et al. | |
| 5,274,645 A | 12/1993 | Idleman et al. | |
| 6,092,085 A | 7/2000 | Keene | |
| 6,163,856 A | 12/2000 | Dion et al. | |
| 6,205,449 B1 | 3/2001 | Rastogi et al. | |
| 6,339,793 B1 | 1/2002 | Bostian et al. | |
| 6,349,357 B1 | 2/2002 | Chong, Jr. | |
| 6,397,229 B1 | 5/2002 | Menon et al. | |
| 6,629,263 B1 | 9/2003 | Sassi | |
| 6,658,590 B1 | 12/2003 | Sicola et al. | |

(Continued)

FOREIGN PATENT DOCUMENTS

CA     2419883 A1     8/2004

(Continued)

OTHER PUBLICATIONS

"VMware VMotion", VMware, Inc., http://www.vmware.com/products/vc/vmotion.html, 2 pages.

(Continued)

*Primary Examiner*—Hosain T Alam
*Assistant Examiner*—Van H Ngo
(74) *Attorney, Agent, or Firm*—Stephen J. Walder, Jr.; Randall J. Bluestone (57) ABSTRACT

A system and method for application fault tolerance and recover using topologically remotely located computing devices are provided. A primary computing device runs one instance of an application (i.e. the primary application instance) at a production site and an active standby computing device runs a second instance of the application (i.e. the shadow application instance) at a recovery site which may be topologically remotely located from the production site. The two instances of the application are brought into a consistent state by running an initial application "checkpoint" on the primary computing device followed by an application "restart" on the active standby computing device. Events occurring in the primary application instance may be automatically and continuously recorded in a log and transferred to the recovery site using a peer-to-peer remote copy operation so as to maintain the states of the application instances consistent.

14 Claims, 5 Drawing Sheets

U.S. PATENT DOCUMENTS

| | | | |
|---|---|---|---|
| 6,721,901 | B1 | 4/2004 | McBrearty et al. |
| 6,826,613 | B1 * | 11/2004 | Wang et al. ................. 709/227 |
| 7,054,960 | B1 | 5/2006 | Bezbaruah et al. |
| 7,146,387 | B1 | 12/2006 | Russo et al. |
| 7,346,905 | B2 | 3/2008 | Dorrance et al. |
| 2002/0163910 | A1 * | 11/2002 | Wisner et al. ............... 370/389 |
| 2003/0036882 | A1 | 2/2003 | Harper et al. |
| 2004/0064639 | A1 | 4/2004 | Sicola et al. |
| 2004/0064659 | A1 | 4/2004 | Achiwa et al. |
| 2004/0111720 | A1 | 6/2004 | Vertes |
| 2005/0021836 | A1 | 1/2005 | Reed et al. |
| 2005/0071380 | A1 * | 3/2005 | Micka et al. ................. 707/200 |
| 2005/0081091 | A1 | 4/2005 | Bartfai et al. |
| 2005/0099963 | A1 | 5/2005 | Multer et al. |
| 2005/0108470 | A1 | 5/2005 | Gold et al. |
| 2005/0160315 | A1 | 7/2005 | Chandrasekaran et al. |
| 2005/0251785 | A1 | 11/2005 | Vertes et al. |
| 2005/0262411 | A1 | 11/2005 | Vertes et al. |
| 2005/0262483 | A1 * | 11/2005 | Laird .......................... 717/120 |
| 2006/0015770 | A1 | 1/2006 | Dicorpo et al. |
| 2007/0033361 | A1 | 2/2007 | Abdulvahid et al. |
| 2007/0214196 | A1 | 9/2007 | Garimella et al. |

FOREIGN PATENT DOCUMENTS

| | | | |
|---|---|---|---|
| JP | | 2001034568 A | 2/2001 |

OTHER PUBLICATIONS

"Meiosys Relocates Multi-Tier Applications Without Interruption of Service", PRNewswire, http://www.prnewswire.com/cgi-bin/stories.pl?ACCT=104&STORY=/www/story/11-23-20..., 2 pages.

"Meiosys Releases MetaCluster UC Version 3.0", PRNewswire, http://www.prnewswire.com/cgi-bin/stories.pl?ACCT=109&STORY=/www/story/01-24-20..., 4 pages.

Warrick et al., "IBM TotalStorage PPRC Migration Manager and FlashCopy Manager Overview", Redbooks, IBM Corporation, 2005, ibm.com/redbooks, pp. 1-26.

Castets et al., "IBM TotalStorage Enterprise Storage Server PPRC Extended Distance", Redbooks, IBM Corporation, Jun. 2002, ibm.com/redbooks, 184 pages.

"Meiosys breaks technology barrier for cost-effective fault tolerance technology designed to be embedded in OEM platform solutions", Primeur Monthly, http://www.hoise.com/primeur/05/articles/monthly/AE-PR-05-05-46.html, 10 pages.

Rougier, Marc, "Non-intrusive Middleware for Continuity of Service: Protection Against System Failures", 47th Meeting of IFIP WG10.4, Puerto Rico, Jan. 2005, www2.laas.fr/IFIPWG/Workshops&Meetings/47/WS/04-Rougier.pdf, 23 pages.

Flynn, Jr. et al., "System and Method for Relocating Running Applications to Topologically Remotely Located Computing Systems", U.S. Appl. 11/340,813, filed Jan. 25, 2006.

Jasmeer Kuppavilakom Abdulvahid. "System and Method of Error Recovery for Backup Applications", U.S. Appl. No. 11/669,321, filed Jan. 31, 2007.

* cited by examiner

SYSTEM AND METHOD FOR APPLICATION FAULT TOLERANCE AND RECOVERY USING TOPOLOGICALLY REMOTELY LOCATED COMPUTING DEVICES

BACKGROUND

1. Technical Field

The present application relates generally to an improved data processing system and method. More specifically, the present application is directed to a system and method for relocating running applications to topologically remotely located computing systems.

2. Description of Related Art

High availability and disaster recovery are increasingly more important in the information technology industry as today's society relies more heavily on electronic systems to perform daily activities. In this vein, it is becoming more important to be able to transfer a running application from one server computing device to another so as to ensure that the running application is available if a server computing system fails. Moreover, it is important to be able to relocate running applications in the event of a failure of a server computing system so that the running application may be recovered on a different computing system.

High availability of applications may be achieved by providing clustered server/storage environments that protect against server and storage failures. In such environments, when a failure occurs, the application is restarted on a redundant server and/or storage system in the clustered server/storage environment with only a small time in which the application is made unavailable.

In some clustered server/storage environments, a hot standby server/storage system is provided and a log shipping technique is used. With the log shipping technique, a log of the application state is maintained by a production server and is shipped to the hot standby server in order to keep the application state of the standby server close to the current state of the application on the production server. If a failover to the standby server is required, only updates since the last log update was shipped to the standby server will be lost.

It should be noted that such server clusters or storage system clusters are topologically and geographically limited such that the devices that make up the cluster must be in relative close proximity to one another. The clustered server/ storage environments do not provide any application independent mechanism for providing availability and disaster recovery at remote network topological and/or geographic distances. Moreover, the clustered server/storage environments do not provide any such availability and recovery mechanism that has zero data loss including no loss of in-flight transactions.

One known solution for relocating running applications in a storage area network (SAN) is provided by the VMotion™ software available from VMWare (an evaluation copy of VMotion™ is available from www.vmware.com/products/vc/vmotion.html). The VMotion™ software allows users to move live, running virtual machines from one physical server computing system to another physical server computing system connected to the same SAN while maintaining continuous service availability. The VMotion™ software is able to perform such relocation because of the virtualization of the disks in the SAN.

However, VMotion™ is limited in that it requires that the entire virtual machine, which may comprise the operating system and a plurality of running applications, be moved to the new physical server computing device. There is no ability in the VMotion™ software to be able to move individual applications from one physical server computing device to another.

Moreover, VMotion™ is limited in that the movement of virtual machines can only be performed from one server computing device to another in the same SAN. Thus, VMotion™ cannot be used to move virtual machines to other server computing devices that are outside the SAN. This, in essence, places a network topology and geographical limitation on the server computing devices to which virtual machines may be moved using the VMotion™ software product.

Another known solution for providing high availability and disaster recovery of running applications is the MetaCluster™ UC 3.0 software product available from Meiosys, Inc., which has been recently acquired by International Business Machines, Inc. As described in the article "Meiosys Releases MetaCluster UC Version 3.0," available from PR Newswire at www.prnewswire.com, the MetaCluster™ software product is built upon a Service Oriented Architecture and embodies the latest generation of fine-grained virtualization technologies to enable dynamic data centers to provide preservation of service levels and infrastructure optimization on an application-agnostic basis under all load conditions.

Unlike coarse-grained virtual machine technologies and virtual machine mobility technologies, such as VMotion™ described above, which run at the operating system level and can only move an entire virtual machine at one time, the MetaCluster™ software product runs in a middleware layer between the operating system and the applications. MetaCluster™ provides a container technology which surrounds each application, delivering both resource isolation and machine-to-machine mobility for applications and application processes.

The MetaCluster™ software product's application virtualization and container technology enables relocation of applications both across physical and virtual machines. MetaCluster™ also provides substantial business intelligence which enables enterprises to set thresholds and define rules for managing the relocation of applications and application processes from machine to machine, both to address high availability and utilization business cases.

Deploying MetaCluster™ UC 3.0 for business critical applications allows applications to be virtualized very efficiently so that the performance impact is unnoticeable (typically under 1%). Virtualized applications may then be moved to the infrastructure best suited from a resource optimization and quality of service standpoint. Server capacity can be reassigned dynamically to achieve high levels of utilization without compromising performance. Since MetaCluster™ UC 3.0 enables the state and context of the application to be preserved during relocation, the relocation is both fast and transparent to the users of the applications.

MetaCluster™ UC 3.0 uses a transparent "checkpoint and restart" functionality for performing such relocation of applications within server clusters. When generating a checkpoint, the necessary stateful data and metadata for recreating the full state, connections and context of the running application are preserved for a particular point in time. This checkpoint may then be provided to another server computing device in the same cluster as the original server computing device. The server computing device to which the checkpoint is provided may then use the checkpoint information to restart the application, using application data available from a shared storage system of the cluster, and recreate the state, connections, and context of the application on the new server computing device.

In a further product from Meiosys, i.e. MetaCluster™ FT a "Record and Replay" technology is provided in which events that continuously impact the behavior of an application at runtime are recorded to disk in the form of log files and then those events may be replayed in the event of a failure. Thus, the "Record and Replay" technology of MetaCluster™ FT allows recorded events to be replayed on a redundant application instance in the same server cluster in the event of a failure in order to provide failover fault tolerance. Information about the "Record and Replay" aspects of the MetaCluster™ FT (formerly referred to as "Meiosys FT") software product may be found, for example, in "Meiosys breaks technology barrier for cost-effective fault tolerance technology designed to be embedded in OEM platform solutions" available from Primeur Monthly at www.hoise.com/primeur/05/articles /monthly/AE-PR-05-05-46.htmlat and the presentation materials for the 47th Meeting of IFIP WG10.4 in Puerto Rico available at www2.laas.fr/IFIPWG/Workshops&Meetings/47/WS/04-Rougier.pdf.

While MetaCluster™ UC 3.0 and MetaCluster™ FT allow relocation and failover of individual applications within the same cluster, as opposed to requiring entire virtual machines to be relocated, MetaCluster™ UC and FT are still limited to a localized cluster of server computing devices. That is, MetaCluster™ relies on the ability of all of the server computing devices having access to a shared storage system for accessing application data. Thus, MetaCluster™ UC and FT do not allow movement or relocation of running applications outside of the server cluster or failover of application instances outside of the server cluster. Again this limits the network topology and geographical locations of computing devices to which running applications may be relocated and to which failover may be performed.

SUMMARY

In view of the above, it would be beneficial to have a system, method and computer program product for providing application fault tolerance and recovery using topologically and/or geographically remotely located computing devices. Moreover, it would be beneficial to have a system, method, and computer program product for relocating running applications to computing devices topologically remotely located outside a storage area network or cluster of computing devices in which the running applications were previously present. Furthermore, it would be beneficial to have such a fault tolerance and relocation mechanism that maintains synchronization between a production computing device and the remotely located computing device such that no data loss is experienced, including no data loss with regard to in-flight transactions. The illustrative embodiments described hereafter provide such a system, method and computer program product.

It should be noted that the description of the illustrative embodiments provided herein refers to computing devices being "topologically remotely located." Being "topologically remotely located," in the present description, refers to the computing system being outside the cluster or storage area network of the computing device from which the running application is being relocated. In many cases a topologically remotely located computing system may be geographically remotely located as well, but this is not required for the computing system to be topologically remotely located. Rather, the topologically remotely located computing system need only be remotely located in terms of the network topology connecting the various computing devices.

With the mechanisms of the illustrative embodiments, a primary computing device runs one instance of an application (i.e. the primary application instance) at a production site and an active standby computing device runs a second instance of the application (i.e. the shadow application instance) at a recovery site which may be topologically remotely located from the production site. The primary computing device and active standby computing device have the same virtual network address such that both computing devices may receive the same inputs from a network via network address virtualization, as is generally known in the art.

The two instances of the application are brought into a consistent state by running an initial application "checkpoint" on the primary computing device followed by an application "restart" on the active standby computing device. The generation of the "checkpoint" of the primary application instance on the primary computing device and the "restarting" of the shadow application instance on the active standby computing device may make use of the mechanism described in commonly assigned and co-pending U.S. patent application Ser. No. 11/340,813 , filed on Jan. 25, 2006, which is hereby incorporated by reference. For example, the generation of a checkpoint may involve copying application data for the primary application instance on the primary computing device to a storage system of the topologically remotely located computing device. The copying of application data may be performed using mirroring technology, such as a peer-to-peer remote copy operation, for example.

In addition to copying the application data, a stateful checkpoint of the primary application instance may be generated and stored to a storage medium. The stateful checkpoint comprises a set of metadata describing the current state of the primary application instance at the particular point in time when the stateful checkpoint is generated. Preferably, the stateful checkpoint is generated at substantially the same time as the copying of the application data so as to ensure that the state of the application as represented by the stateful checkpoint metadata matches the application data.

The stateful checkpoint metadata may be copied to the same or different storage system associated with the topologically remotely located computing device in a similar manner as the application data. For example, a peer-to-peer remote copy operation may be performed on the checkpoint metadata to copy the checkpoint metadata to the topologically remotely located storage system.

In one illustrative embodiment, the MetaCluster™ product may be used to generate stateful checkpoint metadata for the primary application instance as if the application were being relocated within a local cluster of server computing devices. In such an illustrative embodiment, the stateful checkpoint metadata and application data may be relocated to a topologically remotely located computing device using the Peer-to-Peer Remote Copy (PPRC) product available from International Business Machines, Inc. of Armonk, N.Y., also referred to by the name Metro Mirror™.

Moreover, in another illustrative embodiment, the relocation may be performed using the Global Mirror™ product, also available from International Business Machines, Inc., which implements an asynchronous replication method that can be guaranteed to be consistent. Global Mirror™ is actually a combination of the Metro Mirror™ product, Global Copy™ product, and FlashCopy™ product available from International Business Machines, Inc. Global Mirror™ uses Global Copy to maximize data replication throughput and dynamically switches to synchronous mode (Metro Mirror) to get to a consistent state, preserves that consistent state using FlashCopy™, and switches back to Global Copy™ (also referred to as PPRC-XD). Metro Mirror™ has not data loss but is limited to approximately a 300 kilometer range while Global Mirror™ has minimal data loss but has no distance limitation.

After generating an initial checkpoint of the primary application instance running on the primary computing device, and copying this checkpoint's stateful checkpoint metadata and application data to the topologically remotely located computing device, the shadow application instance is "restarted" using the application data and stateful checkpoint metadata. This in effect causes the shadow application instance to have the same state and application data as the primary application instance and thereby synchronize the shadow application instance with the primary application instance.

After having synchronized the application instances so that they have consistent states with each other, events occurring in the primary application instance may be continuously recorded in a log and then replayed at the recovery site so as to maintain the states of the application instances consistent. The log may be a high speed pipeline to the shadow application instance, a log file on a shared file system, a log file that is automatically replicated and applied at the recovery site, or the like.

In one illustrative embodiment, continuous consistency between the application instances may be provided by automatically performing a peer-to-peer remote copy operation on the log event data as the log event data is written to the log storage in the production site or upon the closing of a log file. That is, log event data may be written to the log file in the log storage of the production site and then automatically copied to a storage system associated with the recovery site using a Metro Mirror™ or Global Mirror™ operation, for example. Alternatively, the log event data may be written to the log file in the log storage of the production site and then copied to the log storage at the recovery site when the log file is closed.

In either embodiment, the log will eventually be closed, such as when the log becomes full or at some predetermined time interval, at which time the logging of events is switched from a first log file to a secondary log file. The closing of the log may be communicated to the active standby computing device in the recovery site at which time events logged in the first log file may be replayed by the shadow application instance while event logging is continued using the secondary log file. The event logging using the secondary log file is likewise automatically replicated in a storage system associated with the recovery site.

The shadow application instance preferably has all of its network outputs, i.e. shadow sockets, disabled in order to avoid conflicts on the network with the primary application instance, such as message duplication. The shadow application instance's network outputs may be activated in the event that the primary application instance at the production site fails and the shadow application instance must take over for the failed primary application instance.

When a failure of the primary application instance occurs at the production site, the active standby computing device detects the loss of the primary application instance. The shadow application instance is at a state corresponding to the last replay of logged events, which will typically occur when the logs are switched, e.g., from a first log file to a second log file. At this point, the second log file, which is continuously and automatically replicated by use of the peer-to-peer copy operation, contains all of the events that have occurred in the primary application instance since the log switch. Thus, the shadow application instance need only replay the events in the second log in order to bring the shadow application instance to a state corresponding to the state of the primary application instance just prior to the failure of the primary application instance. The network outputs, i.e. shadow sockets, may then be enabled such that the shadow application instance may now generate outputs that are sent across the network to client devices. In this way, the shadow application instance may then take over the functions of the primary application instance without data loss.

In one illustrative embodiment, a computer program product comprising a computer usable medium having a computer readable program is provided. The computer readable program, when executed on a standby computing device, causes the standby computing device to automatically receive, from a primary computing device topologically remotely located from the standby computing device, event data for a primary application instance written to a first log data structure associated with the primary computing device. The computer readable program may further cause the computing device to store the event data in a second log data structure associated with the standby computing device and a shadow application instance. The primary application instance and shadow application instance may be instances of a same application. The computer readable program may also cause the computing device to update a state of the shadow application instance by replaying events in the second log associated with the shadow application instance to thereby bring a state of the shadow application instance to a consistent state with the primary application instance. Moreover, the computer readable program may further cause the computing device to relocate the primary application instance to the standby computing device using the shadow application instance in response to a failure of the primary application instance.

The computer readable program may cause the standby computing device to update a state of the shadow application instance in response to receiving a log switch event message from the primary computing device indicating a log switch event. The computer readable program may cause the standby computing device to store event data received subsequent to receiving the log switch event message to a third log data structure associated with the shadow application instance. The computer readable program may further causes the standby computing device to relocate the primary application instance to the standby computing device by detecting a failure of the primary application instance on the primary computing device, and replaying events in the third log data structure in response to detecting the failure of the primary application instance.

The primary computing device and standby computing device may have a same virtual network address. Input and output sockets of the primary application instance may be enabled and only input sockets of the shadow application instance may be enabled prior to relocating the primary application instance.

The computer readable program may further cause the standby computing device to detect a failure of the primary application instance on the primary computing device and replay events in the third log data structure in response to detecting the failure of the primary application instance to thereby bring the shadow application instance to a consistent state with the primary application instance just prior to the detected failure of the primary application instance. The computer readable program may also enable output sockets of the shadow application instance in response to detecting the failure of the primary application instance.

The computer readable program may further cause the standby computing device to synchronize a state of the shadow application instance with a state of the primary application instance prior to receiving event data from the primary computing device. The computer readable program may cause the standby computing device to synchronize a state of the shadow application instance with a state of the primary application instance by receiving application data for the primary application instance from the topologically remotely located primary computing device and receiving an application checkpoint comprising checkpoint metadata that represents a same point in time as the copy of the application data. The computer readable program may initialize the shadow application instance on the standby computing device using the application data and checkpoint metadata.

The primary computing device may automatically write the event data for events occurring in the primary application instance in the first log data structure and automatically copy the event data to the second log data structure as the event data is written to the first log data structure. The event data may be automatically received via a peer-to-peer remote copy operation executed by the primary computing device.

The standby computing device may be geographically remotely located from the primary computing device. The standby computing device may be outside a cluster or storage area network of the primary computing device. In a further illustrative embodiment, a standby computing system is provided that comprises a processor and a memory coupled to the processor. The memory may contain instructions which, when executed by the processor, cause the processor to perform various ones and combinations of the operations outlined above with regard to the computer program product illustrative embodiment.

In yet another illustrative embodiment, a method, in a standby computing device, for providing a shadow application instance for relocation of a primary application instance is provided. The method may comprise various ones and combinations of the operations outlined above with regard to the computer program product illustrative embodiment.

These and other features and advantages of the illustrative embodiments will be described in, or will become apparent to those of ordinary skill in the art in view of, the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments set forth herein provide mechanisms for maintaining a shadow application instance that is running in an active standby computing device that is topologically, and often times geographically, remotely located, i.e. not within the same storage area network or cluster, from a primary computing device running a primary application instance of the same application. As such, the mechanisms of the illustrative embodiments are preferably implemented in a distributed data processing environment.

Figure 1:
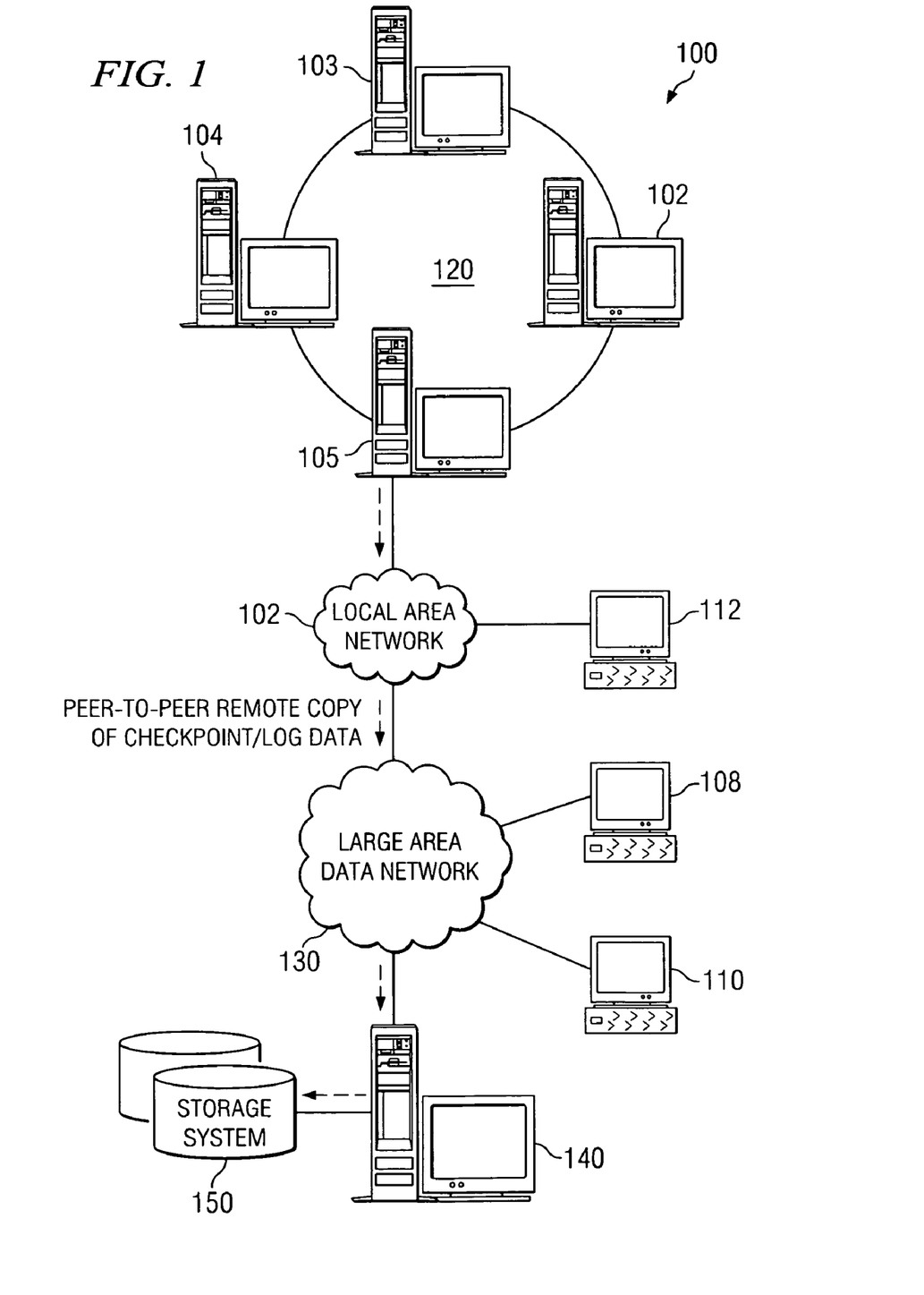
FIG. 1 is an exemplary block diagram of a distributed data processing system in which exemplary aspects of the illustrative embodiments may be implemented.
Figure 2:
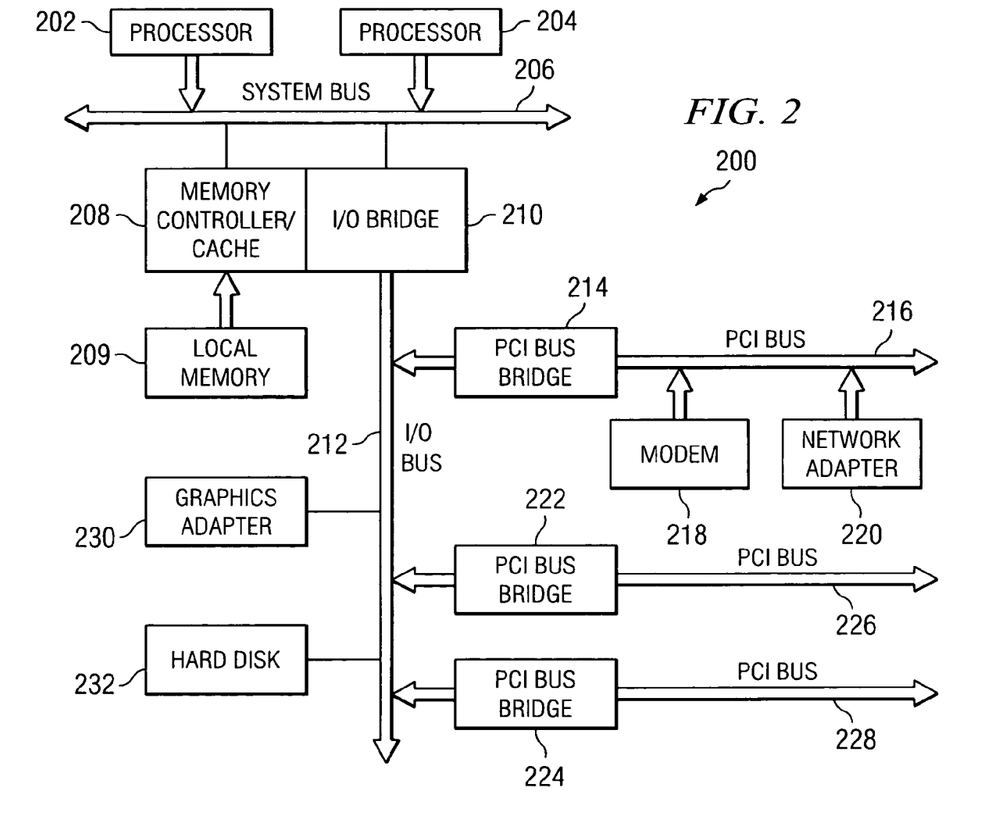
FIG. 2 is an exemplary block diagram of a server computing device in which exemplary aspects of the illustrative embodiments may be implemented.

In the following description, the mechanisms of the illustrative embodiments will be described in terms of a distributed data processing environment in which there is a plurality of data processing systems provided that may communicate with one another via one or more networks and communication links. FIGS. 1 and 2 provide examples of data processing environments in which aspects of the illustrative embodiments may be implemented. The depicted data processing environments are only exemplary and are not intended to state or imply any limitation as to the types or configurations of data processing environments in which the exemplary aspects of the illustrative embodiments may be implemented. Many modifications may be made to the data processing environments depicted in FIGS. 1 and 2 without departing from the spirit and scope of the present invention.

With reference now to the figures, FIG. 1 depicts a pictorial representation of a network of data processing systems 100 in which the present invention may be implemented. Network data processing system 100 contains a local area network (LAN) 102 and a large area data network 130, which are the media used to provide communication links between various devices and computers connected together within network data processing system 100. LAN 102 and large area data network 130 may include connections, such as wired communication links, wireless communication links, fiber optic cables, and the like.

In the depicted example, server computing devices 102-105 are connected to LAN 102. The server computing devices 102-105 may comprise a storage area network (SAN) or a server cluster 120, for example. SANs and server clusters are generally well known in the art and thus, a more detailed explanation of SAN/cluster 120 is not provided herein.

In addition to server computing devices 102-105, client 112 is connected to LAN 102. Clients 108 and 110 are connected to the large area data network 130. These clients 108, 110, and 112 may be, for example, personal computers, workstations, application servers, or the like. In the depicted example, server computing devices 102-105 may store, track, and retrieve data objects for clients 108, 110 and 112. Clients 108, 110, and 112 are clients to server computing devices 102-105 and thus, may communication with server computing devices 102-105 via the LAN 102 and/or the large area data network 130 to run applications and interface with running applications on the server computing devices 102-105 and obtain data objects from these server computing devices 102-105. Network data processing system 100 may include additional servers, clients, and other devices not shown.

The large area data network 130 is coupled to the LAN 102. In the depicted example, the large area data network 130 may be the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

Of course, large area data network 130 may also be implemented as a number of different types of networks, such as for example, an intranet, another local area network (LAN), a wide area network (WAN), or the like. FIG. 1 is only intended as an example, and is not intended to state or imply any architectural limitations for the illustrative embodiments described herein.

It should be noted that the Internet is typically used by servers in a cluster to communicate with one another using TCP/IP for messaging traffic. Storage controllers participating in mirroring, such as Metro Mirror™ or Global Mirror™ as discussed hereafter, typically communicate over a separate storage network using FICON channel commands, SCSI commands, or TCP/IP.

Server computing device 140 is coupled to large area data network 130 and has an associated storage system 150. Storage system 150 is shown as being directly coupled to the server computing device 140 but, alternatively, may be indirectly accessed by the server computing device 140 via the large area data network 130 or another network (not shown). Server computing device 140 is topologically remotely located from the SAN/cluster 120. That is, server computing device 140 is not part of the SAN/cluster 120. Moreover, Server computing device 140 may be geographically remotely located from the SAN/cluster 120.

In one illustrative embodiment, the server computing device 140 operates as an active standby server computing device for one or more of the server computing devices 102-105 in SAN/cluster 120. As such, the server computing device 140 has the same virtual network address on the large area data network 130 as the server computing devices 102-105 in SAN/cluster 120. Such virtualization of network addresses, e.g., Internet Protocol (IP) addresses, is generally known in the art and thus, a detailed explanation is not provided herein. Suffice it to say that through virtualization of the network addresses of the server computing devices 102-105 and 140, network traffic directed to or from these server computing devices 102-105 and 140 may make use of the same virtual network address with mechanisms provided for redirecting such traffic to the appropriate server computing device 102-105 and 140.

The illustrative embodiments described hereafter provide mechanisms for fault recovery of running application instances on one or more of the server computing devices 102-105 of the SAN/cluster 120 by utilizing shadow application instances on the topologically remotely located server computing device 140. It should be appreciated that while the illustrative embodiments will be described in terms of fault recovery of running application instances on a SAN/cluster 120, the illustrative embodiments and the present invention are not limited to such. Rather, instead of the SAN/cluster 120, a single server computing device, or even client computing device, may be the source of a primary running application instance whose state is made consistent with a corresponding shadow application instance on the topologically remotely located computing device (either server or client computing device) in order to provide fault tolerance, without departing from the spirit and scope of the present invention.

Referring now to FIG. 2, a block diagram of a data processing system that may be implemented as a server computing device, such as one or more of server computing devices 102-105 or server computing device 140 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 and/or other network coupled devices may be provided through modem 218 and/or network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Referring again to FIG. 1, with the mechanism of the illustrative embodiments, it is desirable to provide high availability and disaster recovery for application instances running on one or more of the server computing devices 102-105 of the SAN/cluster 120. In particular, it is desirable to have a topologically and/or geographically remotely located server computing device 140 which may operate as an active standby server computing device that runs a shadow application instance of the same application that is being run in one or more of the server computing devices 102-105. In this way, the topologically and/or geographically remotely located server computing device 140 may operate as a "hot swappable" server computing device for one or more of the server computing devices 102-105 even though it is remotely located from the SAN/cluster 120. Such "hot swapping" may be performed with no data loss in the process.

As discussed above, known mechanisms, such as VMotion™ and MetaCluster™ only permit relocation and failover of running applications within a local topology, i.e. within SAN/cluster 120. With these known mechanisms, the computing devices to which running applications may be relocated or failed-over must have access to the same shared storage system, thereby limiting relocation to a local topology and geographical area. The known mechanisms do not permit relocation/failover of running applications to topologically and/or geographically remotely located computing devices.

With the mechanisms of the illustrative embodiments, a primary computing device, such as server 102, runs one instance of an application (i.e. the primary application instance) at a production site and an active standby computing device, such as server 140, runs a second instance of the application (i.e. the shadow application instance) at a recovery site which may be topologically, and/or geographically, remotely located from the production site. The primary computing device 102 and active standby computing device 140 have the same virtual network address such that both computing devices may receive the same inputs from a network via network address virtualization, as is generally known in the art.

The two instances of the application are brought into a consistent state by running an initial application "checkpoint" on the primary computing device 102 followed by an application "restart" on the active standby computing device 140. The generation of the "checkpoint" of the primary application instance on the primary computing device 102 and the "restarting" of the shadow application instance on the active standby computing device 140 may make use of the mechanism described in commonly assigned and co-pending U.S. patent application Ser. No. 11/340,813, filed on Jan. 25, 2006, which is hereby incorporated by reference. For example, the generation of a checkpoint may involve copying application data for the primary application instance on the primary computing device 102 to a storage system of the topologically remotely located computing device 140. The copying of application data may be performed using mirroring technology, such as a peer-to-peer remote copy operation, for example.

In addition to copying the application data, a stateful checkpoint of the primary application instance may be generated and stored to a storage medium. The stateful checkpoint comprises a set of metadata describing the current state of the primary application instance at the particular point in time when the stateful checkpoint is generated. Preferably, the stateful checkpoint is generated at substantially the same time as the copying of the application data so as to ensure that the state of the application as represented by the stateful checkpoint metadata matches the application data.

The stateful checkpoint metadata may be copied to the same or different storage system associated with the topologically remotely located computing device 140 in a similar manner as the application data. For example, a peer-to-peer remote copy operation may be performed on the checkpoint metadata to copy the checkpoint metadata to the topologically remotely located storage system.

In one illustrative embodiment, the MetaCluster™ product may be used to generate stateful checkpoint metadata for the primary application instance as if the application were being relocated within a local cluster of server computing devices. In such an illustrative embodiment, the stateful checkpoint metadata and application data may be relocated to a topologically remotely located computing device using a peer-to-peer remote copy operation, such as is provided by either the Metro Mirror™ or Global Mirror™ products available from International Business Machines, Inc. of Armonk, N.Y.

Information regarding the MetaCluster™ product may be found, for example, in the articles "Meiosys Releases Meta-Cluster UC Version 3.0" and "Meiosys Relocates Multi-Tier Applications Without Interruption of Service," available from the PR Newswire website (www.prnewswire.com). Additional information regarding MetaCluster™ and the ability to replicate application states within a cluster may be found in U.S. Patent Application Publication No. 2005/0251785. Information regarding an exemplary peer-to-peer remote copy may be obtained, for example, in the Redbooks paper entitled "IBM TotalStorage Enterprise Storage Server PPRC Extended Distance," authored by Castets et al., and is available at the official website for International Business Machines, Inc. (www.ibm.com). These documents are hereby incorporated herein by reference.

After generating an initial checkpoint of the primary application instance running on the primary computing device 102, and copying this checkpoint's stateful checkpoint metadata and application data to the topologically remotely located computing device 140, the shadow application instance is "restarted" using the application data and stateful checkpoint metadata. This in effect causes the shadow application instance to have the same state and application data as the primary application instance and thereby synchronize the shadow application instance with the primary application instance.

After having synchronized the application instances so that they have consistent states with each other, events occurring in the primary application instance may be continuously recorded in a log and then replayed at the recovery site so as to maintain the states of the application instances consistent. The log may be a high speed pipeline to the shadow application instance, a log file on a shared file system (not shown), a log file that is automatically replicated and applied at the recovery site, or the like. The recording of events in the log may be performed in a similar manner as provided in the Record and Replay technology of the MetaCluster™ FT, discussed previously, for example.

In one illustrative embodiment, continuous consistency between the application instances may be provided by automatically performing a peer-to-peer remote copy operation on the log event data, using Metro Mirror™ or Global Mirror™, for example, as the log event data is written to the log storage in the production site or upon the closing of a log file. That is, log event data may be written to the log file in the log storage of the production site and then automatically copied to a storage system associated with the recovery site using a peer-to-peer remote copy operation, for example. Alternatively, the log event data may be written to the log file in the log storage of the production site and then copied to the log storage at the recovery site when the log file is closed.

In either embodiment, the log will eventually be closed, such as when the log becomes full or at some predetermined time interval, at which time the logging of events is switched from a first log file to a secondary log file. The closing of the log may be communicated to the active standby computing device in the recovery site, at which time, events logged in the first log file may be replayed by the shadow application instance while event logging is continued using the secondary log file. The event logging using the secondary log file is likewise automatically replicated in a storage system associated with the recovery site.

The shadow application instance preferably has all of its network outputs, i.e. shadow sockets, disabled in order to avoid conflicts on the network with the primary application instance, such as message duplication. Such disabling of sockets may comprise, for example, creating a socket and then closing it. However, on an active standby computing device at the recovery site, only the socket output is disabled (closed) while the socket input is enabled. This allows for all the recorded logs to be replayed by the active standby computing device at the recovery site, but without sending any messages out to the network. The production site computing device receives input messages (events) from the network clients while the active standby receives the recorded logs of events from the production site computing device, but only the production site computing device has the socket output enabled.

The shadow application instance's network outputs may be activated in the event that the primary application instance at the production site fails and the shadow application instance must take over for the failed primary application instance. When a failure of the primary application instance occurs at the production site, the active standby computing device 140 detects the loss of the primary application instance. The detection of the loss of the primary application instance may be based on, for example, a failure to receive a heartbeat signal from the production site computing device. Other mechanisms for detecting the primary application instance failure may be used without departing from the spirit and scope of the present invention.

At this point in time, the shadow application instance is at a state corresponding to the last replay of logged events, which will typically occur when the logs are switched, e.g., from a first log file to a second log file. At this point, the second log file, which is continuously and automatically replicated by use of the peer-to-peer copy operation, contains all of the events that have occurred in the primary application instance since the log switch. Thus, the shadow application instance need only replay the events in the second log in order to bring the shadow application instance to a state corresponding to the state of the primary application instance just prior to the failure of the primary application instance. The network outputs, i.e. shadow sockets, may then be enabled such that the shadow application instance may now generate outputs that are sent across the network to client devices. Since the active standby computing device 140 has the same virtual network address as the primary computing device 102, inputs from client devices may be received by the active standby computing device 140. In this way, the shadow application instance may then take over the functions of the primary application instance without data loss.

As mentioned above, with the illustrative embodiments, the logs of events occurring in a primary application instance are automatically and continuously transferred to the active standby computing device 140 so as to keep the state of the shadow application instance running on the active standby computing device 140 consistent with the current state of the primary application instance running on the primary computing device 102. This automatic and continuous transfer is facilitated by the use of a remote copy operation, such as a peer-to-peer remote copy operation.

Figure 3:
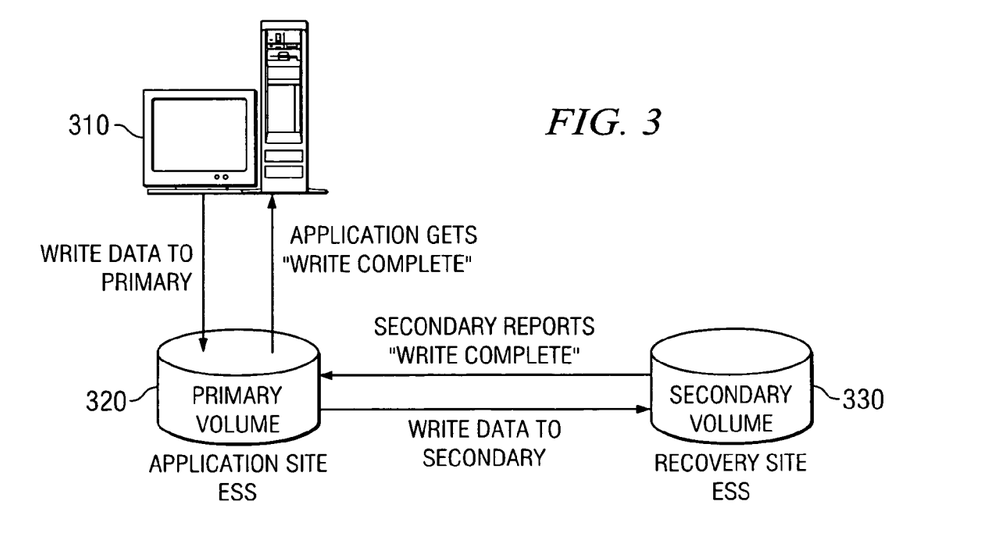
FIG. 3 is an exemplary block diagram illustrating the peer-to-peer remote copy operation in accordance with one illustrative embodiment.

FIG. 3 is an exemplary block diagram illustrating the peer-to-peer remote copy operation in accordance with one illustrative embodiment. In the depicted example, the Metro Mirror™ product is used to perform the peer-to-peer remote copy operation, although the present invention is not limited to using Metro Mirror™ or Global Mirror™. Rather, any mechanism that permits the remote copying of data and metadata to a topologically remotely located storage system may be used without departing from the spirit and scope of the present invention.

Using Global Mirror™ as representative of one illustrative embodiment for performing remote copying of data and metadata, Global Mirror™ allows the shadowing of application system data from one site (referred to as the production site) to a second site (referred to as the recovery site). The logical volumes that hold the data at the production site are referred to as primary volumes and the corresponding logical volumes that hold the mirrored data at the recovery site are referred to as secondary volumes. In one illustrative embodiment, the connection between the primary and the secondary volumes may be provided using fiber channel protocol (FCP) links.

FIG. 3 illustrates the sequence of a write operation when operating Global Mirror™ in synchronous mode, i.e. peer-to-peer remote copy-synchronous (PPRC-SYNC). As shown in FIG. 3, in this synchronous type of operation, the updates done to the production site primary volumes 320 are synchronously shadowed onto the secondary volumes 330 at the recovery site. Because this is a synchronous solution, write updates are ensured on both copies (primary and secondary) before the write is considered to be completed for the application running on the computing device 310.

Because in PPRC-SYNC operation the application does not get the "write complete" condition until the update is synchronously done in both the primary and the secondary volumes 320 and 330, from the application perspective, the data at the recovery site secondary volumes 330 is real time data that is always consistent with the data at the primary volumes 320.

One implication of this characteristic is that, in normal PPRC-SYNC operation, dependent writes are applied on the secondary volumes 330 in the same sequence as they are applied in the primary volumes 320. This is very important from an application consistency perspective at the time of the recovery. PPRC-SYNC can provide continuous data consistency at the recovery site without needing to periodically interrupt the application to build consistency checkpoints. From the application perspective this is a non-disruptive way of always having valid data at the recovery location.

While a synchronous PPRC operation is illustrated in FIG. 3, it should be appreciated that the mechanisms of the illustrative embodiments may be equally applicable to both synchronous and asynchronous remote copy operations. In an asynchronous remote copy operation, the "write complete" may be returned from the primary volumes 320 prior to the data being committed in the secondary volumes 330. Essentially, with regard to the asynchronous remote copy operations of the illustrative embodiments herein, the logs in the storage system of the topologically remotely located computing device need to be at a data-consistent state with regard to the logs at the primary computing device prior to any replay of log events on the topologically remotely located computing device.

Thus, with the peer-to-peer remote copy operation of the illustrative embodiments, as writes are performed to the logs present on the storage system associated with the primary computing device 102, corresponding writes are also performed to a corresponding log in a storage system associated with the topologically remotely located computing device 140. This may be done in a synchronous or asynchronous manner. In this way, the logs in both the production site and the recovery site are maintained consistent.

As mentioned above, another alternative to performing such a peer-to-peer remote copy operation of log writes is to use a shared storage system that may be attached to the large area data network 130, for example. In such an embodiment, both the primary computing device 102 and the topologically remotely located computing device 140 must have access to the shared storage system and the logs maintained on the shared storage system. The primary computing device 102 may write to the logs of the shared storage system and the topologically remotely located computing device 140 may read from these logs so as to replay log events to bring the shadow application instance into a consistent state with the primary application instance. Such reading and replaying of events may occur when the primary computing device 102 signals a log switch event to the topologically remotely located computing device 140, for example.

Thus, with the illustrative embodiments, an initial checkpoint is generated and used to synchronize the states of a primary application instance and a remotely located shadow application instance. Thereafter, logs are automatically and continuously maintained consistent between the primary application instance location and the remotely located shadow application instance.

Periodically, logs are closed and logging of events is switched to secondary logs such that the events recorded in the initial logs may be used to update the state of the shadow application instance. This replaying of events from the closed log may be performed without interrupting the continuous logging of events. The switching between the initial and secondary logs may be repeated in the opposite direction, and so forth, as many times as necessary so as to facilitate the continued logging of events and updating of application states.

When a failure of a primary application instance occurs, the state of the shadow application instance may be automatically updated by replaying events from the log that is currently being used to log events. This brings the state of the shadow application instance to a current state of the failed primary application instance. The network outputs of the shadow application instance may then be enabled and the shadow application instance thereby takes over operation for the primary application instance. All of this is done with the shadow application instance running on a topologically and/or geographically remotely located computing device from the primary computing device upon which the primary application instance is running.

Figure 4:
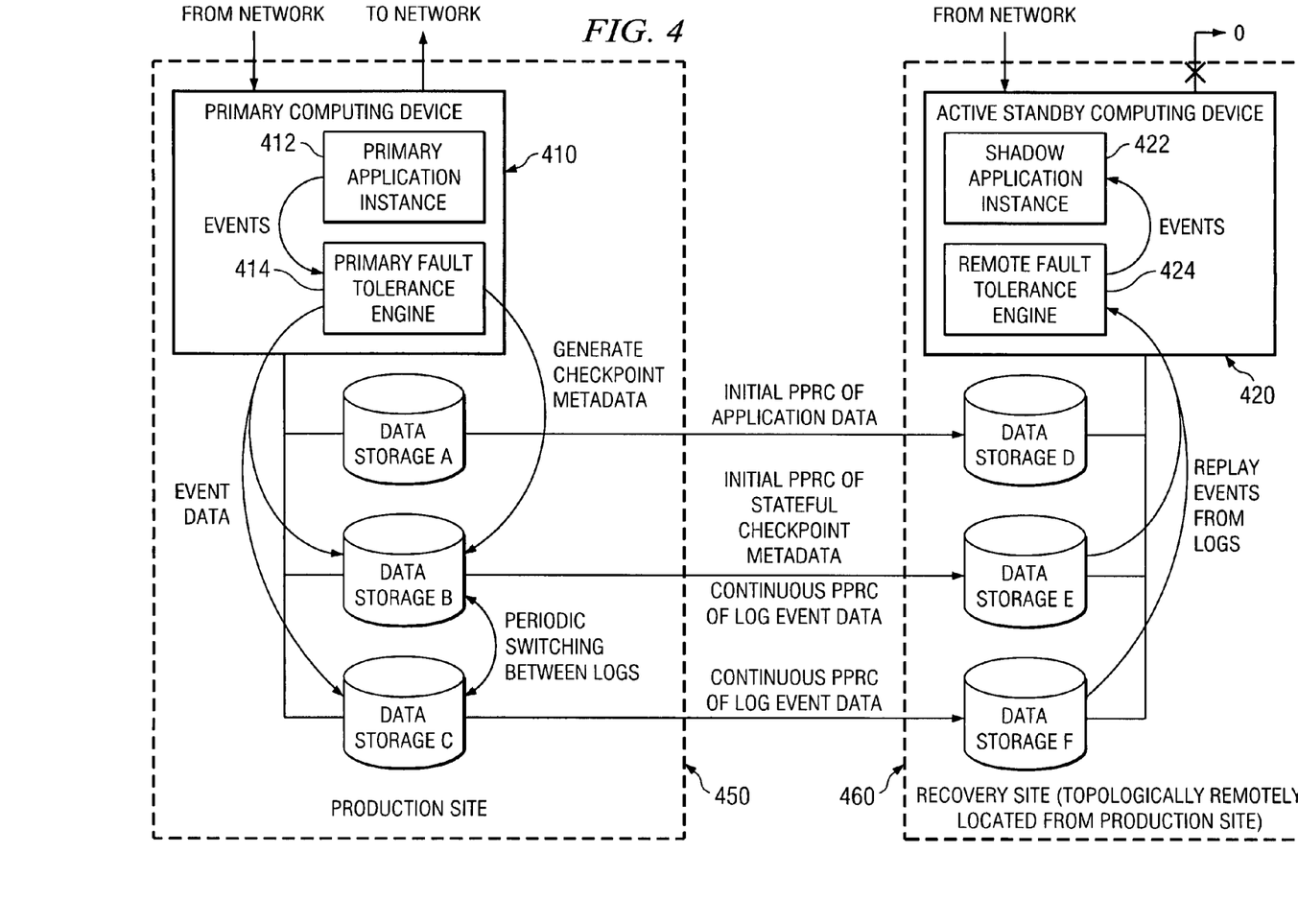
FIG. 4 is an exemplary block diagram illustrating an operation for maintaining continuous consistent application states between two related application instances that are topologically remotely located in accordance with one illustrative embodiment.

FIG. 4 is an exemplary block diagram illustrating an operation for maintaining continuous consistent application states between two related application instances that are topologically remotely located in accordance with one illustrative embodiment. As shown in FIG. 4, a primary computing device 410 is provided at a production site 450 and an active standby computing device 420 is provided at a recovery site 460. The recovery site 460 is topologically and/or geographically remotely located from the production site 450. The primary computing device 410 has associated storage devices A, B and C that are coupled to the primary computing device 410. Data storage device A, in the depicted example, stores application data for the primary application instance 412 running in the primary computing device 410. Data storage device B stores stateful checkpoint metadata as well as one or more logs of events that occur during the running of the primary application instance 412. Data storage device C also stores one or more logs of events that occur during the running of the primary application instance 412. The logs in data storage device C are secondary logs to which logging of events is switched when an initial log in storage device B is closed. Such switching may occur back and forth between logs in storage devices B and C while the primary application instance is running as necessary.

The active standby computing device 420 is coupled to storage devices D, E and F. Storage devices D, E and F are mirrors of storage devices A, B and C. Thus, storage device D stores application data for the primary application instance 412. Storage device E stores checkpoint metadata for the primary application instance 412 as well as one or more logs of events occurring in application instance 412. Storage device F stores the secondary logs of events occurring in the application instance 412.

The data stored in data storage devices A, B, and C at the production site 450 may be transferred to the data storage devices D, E and F at the remotely located recovery site 460 using a peer-to-peer remote copy operation, as previously described above. In particular PPRC is used to copy the initial application data for the primary application instance 412 from the data storage device A to the data storage device D. PPRC is also used to copy initial stateful checkpoint data from data storage B to data storage E. Thereafter, PPRC is used to provide automatic and continuous copying of write data to logs stored in the data storage devices B and C to data storage devices E and F.

The primary computing device 410 includes a primary fault tolerance engine 414 that is responsible for performing operations in accordance with the illustrative embodiments with regard to the primary computing device 410. The active standby computing device 420 includes a remote fault tolerance engine 424 that is responsible for performing operations in accordance with the illustrative embodiments with regard to the active standby computing device 420.

In operation, upon initialization of a primary application instance 412 on the primary computing device 410, for example, or at any other suitable time point at which a stateful checkpoint may be generated, the primary fault tolerance engine 414 generates a checkpoint of the state of the primary application instance 412. This checkpoint involves a copy of the application data at the checkpoint time and stateful checkpoint metadata at the checkpoint time. The checkpoint application data copy is generated and stored in the data storage device A while the stateful checkpoint metadata is generated and stored in the data storage device B. The primary fault tolerance engine 414 may generate the checkpoint using, for example, the MetaCluster™ product as discussed previously.

The primary fault tolerance engine 414 initiates a transfer of a copy of the checkpoint application data and metadata to the recovery site 460 using a peer-to-peer remote copy (PPRC) operation. In response, a copy of the application data and checkpoint metadata is sent from storage devices A and B to storage devices D and E associated with the recovery site 460. The primary fault tolerance engine 414 may send a message to the active standby computing device 420 to "restart" a shadow application instance 422 of the primary application instance 412.

The remote fault tolerance engine 424 may initiate a "restart" operation on the shadow application instance 422 in response to the message from the primary fault tolerance engine 414. The restart operation makes use of the copy of the application data and stateful checkpoint metadata to restart the shadow application instance 422 at a state that corresponds to the initial state of the primary application instance 412 specified by the application data and stateful checkpoint metadata. As mentioned above, the remote fault tolerance engine 424 may use the MetaCluster™ product to perform this restart operation.

While the shadow application instance 422 is being restarted using the application data and stateful checkpoint metadata in data storage devices D and E, the primary application instance 412 is made available to client devices for use. Thus, the primary computing device 410 may receive inputs from client devices via one or more networks and may generate outputs that are sent to the client devices via the one or more networks.

The inputs, processing of the inputs, and generation of outputs results in events occurring in the primary application instance 412. The primary fault tolerance engine 414 records these events occurring in the primary application instance 412 in a log stored in data storage device B. The logging of these events continues until a predetermined criteria is reached, at which time the log in data storage device B is closed and logging of events is switched to a secondary log in data storage device C. This same logging is then performed with regard to data storage device C until the predetermined criteria is again reached at which point logging is switched back to a log maintained in data storage device B. This switching back and forth between logs may be performed repeatedly as necessary during the running of the primary application instance 412.

As events are written to the logs in data storage devices B and C, the same events are written to corresponding logs in data storage devices E and F using a PPRC operation. As described in FIG. 3 above, this PPRC operation is performed immediately after writing the event data to the primary volume, e.g., the log in the data storage device B or C. Thus, the logs in data storage devices E and F are kept consistent with the current state of the logs in data storage devices B and C in an automatic and continuous manner by use of the PPRC operation.

When a predetermined criteria is reached, such as the log becoming full, a predetermined amount of time expiring, or the like, the primary fault tolerance engine 414 may close the log in data storage device B and no longer logs events in the log in data storage device B. The primary fault tolerance engine 414 switches the logging of events to a secondary log in data storage device C. The primary fault tolerance engine 414 may signal the switch of logs to the remote fault tolerance engine 424 which may then close its own copy of the log in data storage device E. The closing of the log in data storage device E may be followed by the remote fault tolerance engine 424 replaying the events recorded in the closed log so as to bring the state of the shadow application instance 422 up to date as of the time of the log switch.

During this update, events continue to be logged by the primary fault tolerance engine 414 in the secondary log in data storage device C. These events are written to the secondary log and are also written to the corresponding log in data storage device F by way of the PPRC operation. Thus, no loss in data occurs even when updating the state of the shadow application instance 422.

As shown in FIG. 4, it should be noted that the input and output sockets of the primary application instance 412 are enabled during the running of the primary application instance 412 on the primary computing device 410. With regard to the shadow application instance 422, the output sockets of the shadow application instance 422 are disabled such that the outputs generated by the shadow application instance 420 are not sent to the client devices. This assures that there are no conflicts on the network with the primary application instance 412, such as message duplication.

At some point in time, the primary application instance 412 may fail and it will be necessary to transfer operations over to the shadow application instance 422 on the topologically and/or geographically remotely located active standby computing device 420. The following is an example illustrating such a failover from the primary application instance 412 to the shadow application instance 422.

It is assumed that while the primary application instance 412 is running on the primary computing device 410, events occurring in the primary application instance 412 are logged in a first log on data storage device B of the production site 450. When predetermined criteria are reached, such as a predetermined interval, logging may be switched from the first log on data storage device B to a second log on data storage device C. If a shared storage system is utilized, events in the first log may be automatically applied to the shadow application instance 422 from the shared storage system in response to the log switch event. However, if a shared storage system is not utilized, as depicted in FIG. 4, the first log and second log are automatically replicated to the data storage devices E and F at the recovery site 460. The events in the copy of the first log on data storage device E may be applied to the shadow application instance 422 without having to terminate the PPRC operation on log events being written to the second log in data storage device C. This allows continuous replication of log events on data storage devices E and F.

At some time while log events are being written to the second log in data storage device C, the primary application instance 412 fails. The loss of the primary application instance 412 at the production site 450 is detected by the remote fault tolerance engine 424, such as by way of a heartbeat signal not being detected, a predetermined time interval elapsing without a log event being replicated from the primary application instance, or the like.

At this time, the state of the shadow application instance 422 is the state of the primary application instance 412 at the point in time when the log switch event occurred. As a result, the events that were logged in the second log in data storage device C, and replicated to data storage device F, need to be replayed in the shadow application instance 422 in order to bring the shadow application instance 422 up to a current state of the primary application instance 412. The remote fault tolerance engine 424 facilitates this replaying of events from the copy of the second log maintained in the data storage device F.

After bringing the shadow application instance up to a current state by replaying the events in the copy of the second log, inputs from client devices may be redirected to the shadow application instance and the output shadow sockets associated with the shadow application instance 422 may be enabled. Thereafter, the shadow application instance may take over operations for the primary application instance 412. Thus, a topologically and/or geographically remotely located active standby computing device 420 may be used to provide failover for a primary application instance with no data loss.

It should be appreciated that while FIG. 4 shows separate storage devices A-F for storage of application data, checkpoint metadata, and logs, the illustrative embodiments are not limited to such. Rather, any number of storage devices may be utilized without departing from the spirit and scope of the present invention. For example, the production site 450 may comprise a single storage device upon which application data, checkpoint metadata and various logs may be stored. Similarly, the recovery site 460 may have one or more storage devices for storing copies of this data that is copied over from the production site 450 using the PPRC operations described above.

Figure 5:
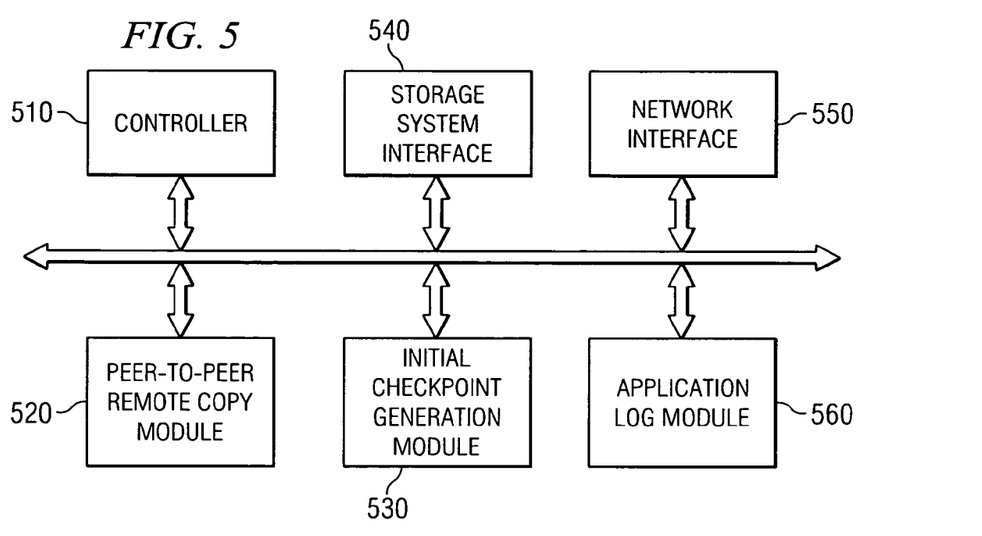
FIG. 5 is an exemplary block diagram of the primary operational components of a primary fault tolerance engine in accordance with one illustrative embodiment.

FIG. 5 is an exemplary block diagram of the primary operational components of a primary fault tolerance engine in accordance with one illustrative embodiment. As shown in FIG. 5, the primary fault tolerance engine includes a controller 510, a peer-to-peer remote copy module 520, a storage system interface 540, an initial checkpoint generation module 530, a network interface 550, and an application log module 560. The elements 510-560 may be implemented in hardware, software, or any combination of hardware and software. In one illustrative embodiment, the elements 510-560 are implemented as software instructions executed by one or more processing devices.

The controller 510 is responsible for the overall operation of the primary fault tolerance engine and orchestrates the operation of the other elements 520-560. The peer-to-peer remote copy module 520 is responsible for performing peer-to-peer remote copying of application data, initial checkpoint metadata, and log event data from the production site 450 to the recovery site 460. The storage system interface 540 provides an interface through which data may be written to or read from the storage device(s) associated with the production site 450. The initial checkpoint generation module 530 is responsible for generating initial copies of application data and stateful checkpoint metadata for transfer to the recovery site 460 for initializing a shadow application instance.

The network interface 550 is responsible for providing an interface through which application data, stateful checkpoint metadata, and log data may be transmitted to the recovery site 460. Messages indicative of initialization of an application instance, log switches, failure of an application instance, and the like may also be transmitted from the primary fault tolerance engine to the remote fault tolerance engine via the network interface 550.

The application log module 560 is responsible for logging events occurring in an application instance in one or more logs that are maintained in a storage system of the production site. The application log module 560 also performs operations for switching between logs.

In operation, the controller 510 instructs the initial checkpoint generation module 530 to generate an initial checkpoint for an application instance and store that checkpoint data to the storage system of the production site via storage system interface 540. The controller 510 then instructs the peer-to-peer remote copy module 520 to copy the checkpoint data to a topologically and/or geographically remotely located recovery site 460.

The controller 510 then instructs the application log module 560 to begin logging events for the primary application instance and performing a peer-to-peer remote copy of such event data to the recovery site 460 using the peer-to-peer remote copy module 520. The logging of events may be done with regard to one or more logs stored in the storage system via the storage system interface 540. Peer-to-peer remote copy operations may be performed via the network interface 550. The application log module 560 may further send messages to the recovery site 460 indicating log switches via the network interface 550.

Figure 6:
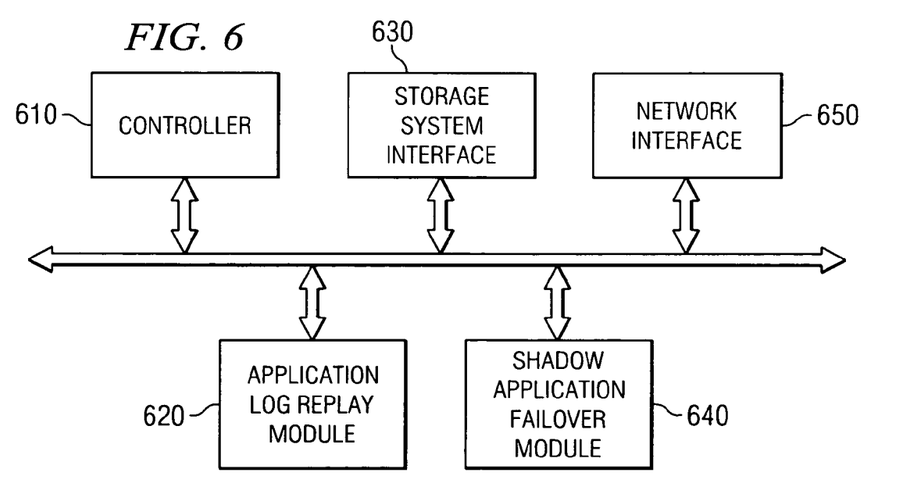
FIG. 6 is an exemplary block diagram of the primary operation components of a remote fault tolerance engine in accordance with one illustrative embodiment.

FIG. 6 is an exemplary block diagram of the primary operation components of a remote fault tolerance engine in accordance with one illustrative embodiment. As shown in FIG. 6, the remote fault tolerance engine includes a controller 610, an application log replay module 620, a storage system interface 630, a shadow application failover module 640, and a network interface 650. The elements 610-650 may be implemented in hardware, software, or any combination of hardware and software. In one illustrative embodiment, the elements 610-650 are implemented as software instructions executed by one or more processing devices.

The controller 610 is responsible for the overall operation of the remote fault tolerance engine and orchestrates the operation of the other elements 620-650. The application log replay module 620 is responsible for replaying log events from logs stored in a storage system associated with the recovery site 460. Such replaying of events may occur when a log switch event occurs or when a primary application instance fails, for example.

The storage system interface 630 provides an interface through which the remote fault tolerance engine may access checkpoint data and logs stored in a storage system associated with the recovery site 460. The network interface 650 provides an interface through which messages and data may be received from the primary fault tolerance engine via one or more networks.

The shadow application failover module 640 performs the necessary operations for failing-over the operations of a primary application instance to a shadow application instance using the logs maintained in the storage system associated with the recovery site 460. The shadow application failover module 640 may perform operations to cause the replay of events from a currently active log so as to bring the shadow application instance up to a current state and then enable shadow sockets of the shadow application instance so that the shadow application instance may take over operations for the failed primary application instance.

In operation, the controller 610 may receive messages from the primary fault tolerance engine of the production site 450 and may instruct various ones of the elements 620 and 640 to operate accordingly. For example, in response to receiving an instruction to initiate a shadow application instance, and in response to receiving checkpoint data which is stored in the storage system associated with the recovery site 460, the controller 610 may initialize a shadow application instance. Thereafter, updates to logs stored in the storage system associated with the recovery site 460 may be received via the network interface 650 and stored in the storage system via the storage system interface 630.

When the controller 610 receives a message from the primary fault tolerance engine indicating that a log switch event has occurred, the controller 610 may instruct the application log replay module 620 to perform a replay of events from the previous log so as to bring the shadow application instance up to data as of the time of the log switch event. When the controller 610 receives a message or otherwise detects that the primary application instance has failed, the controller 610 may instruct the shadow application failover module 640 to perform operations for failing-over the operations of the primary application instance to the shadow application instance, as described previously.

Figure 7:
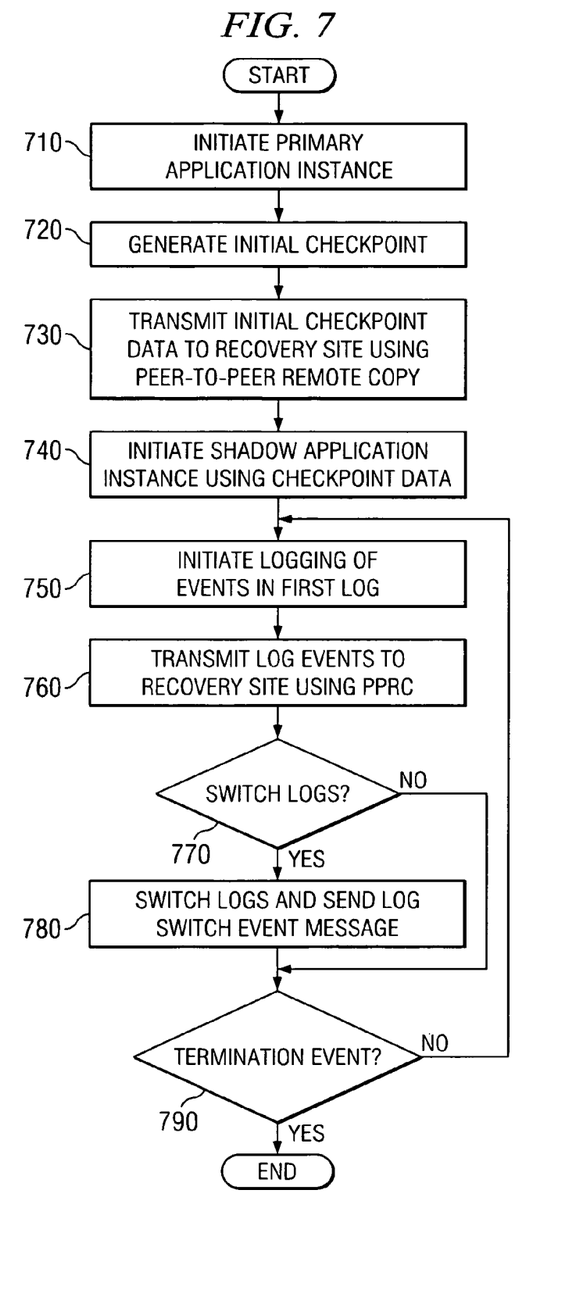
FIG. 7 is a flowchart outlining an exemplary operation for maintaining a continuous consistent state between two related application instances that are topologically remotely located in accordance with an illustrative embodiment.
Figure 8:
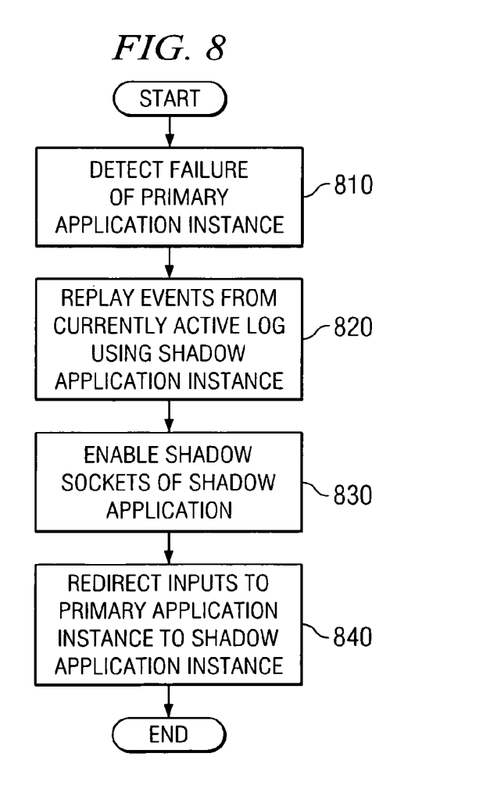
FIG. 8 is a flowchart outlining an exemplary operation for performing a failover operation from a primary application instance to a shadow application instance in accordance with one illustrative embodiment.

FIGS. 7 and 8 are flowcharts outlining exemplary operations of an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation for maintaining a continuous consistent state between two related application instances that are topologically remotely located in accordance with an illustrative embodiment. As shown in FIG. 7, the operation starts with the primary computing device initiating a primary application instance (step 710). A primary fault tolerance engine generates an initial checkpoint of the primary application instance (step 720) and transmits the initial checkpoint data via a peer-to-peer remote copy operation to a recovery site (step 730).

A remote fault tolerance engine receives the checkpoint data and initiates a shadow application instance using the checkpoint data (step 740). The primary fault tolerance engine initiates logging of events in a first log associated with the primary application instance (step 750). The events that are written to the log are automatically and continuously transmitted to the recovery site by the primary fault tolerance engine using a PPRC operation (step 760).

The primary fault tolerance engine determines if a switching of logs is to be performed (step 770). If so, the primary fault tolerance engine switches logging of events from the first log to a second log (or vice versa in subsequent switching events) and a switch log event message is sent to the remote fault tolerance engine. The remote fault tolerance engine receives the switch log event message and replays events recorded in the previous log, e.g., the first log (step 780).

The primary fault tolerance engine determines whether a termination event has occurred (step 790). This termination event may be, for example, the discontinuing of the primary application instance, for example. If a termination event has occurred, the operation is terminated. Otherwise, the operation returns to step 750 and continues to log events using the new event log.

FIG. 8 is a flowchart outlining an exemplary operation for performing a failover operation from a primary application instance to a shadow application instance in accordance with one illustrative embodiment. As shown in FIG. 8, the operation starts with the detection of a failure of a primary application instance by the remote fault tolerance engine (step 810). The remote fault tolerance engine replays the events logged in the currently active log using the shadow application instance (step 820). The shadow sockets of the shadow application are enabled (step 830) and inputs to the primary application instance are redirected to the shadow application instance (step 840). The operation then terminates.

Thus, the illustrative embodiments provide mechanisms for topologically and/or geographically remote computing systems to be used as active standby computing systems for failover operations. The illustrative embodiments provide mechanisms for the automatic and continuous replication of log events between the primary application instance and the shadow application instance such that the two application instances may be maintained with a consistent state. Upon the occurrence of a failure in the primary application instance, the shadow application instance at the topologically and/or geographically remotely located active standby computing device may be used to take over operations for the failed primary application instance with a simple update of the shadow application state using the consistent copy of logged events stored at the remote location. All of this is done with no loss in data.

The illustrative embodiments as described above may take the form of an entirely hardware embodiment, an entirely software embodiment or an embodiment containing both hardware and software elements. In a preferred embodiment, the invention is implemented in software, which includes but is not limited to firmware, resident software, microcode, and the like.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As described previously above with regard to FIG. 2, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the illustrative embodiments of the invention, the practical application, and to enable others of ordinary skill in the art to understand the invention for various illustrative embodiments with various modifications as are suited to the particular use contemplated.

What is claimed is:

1. A standby computing system for providing a shadow application instance for relocation of a primary application instance, comprising:
    a processor; and
    a memory coupled to the processor, wherein the memory contains instructions which, when executed by the processor, cause the processor to:
    automatically receive, from a primary computing device topologically remotely located from the standby computing system, event data for a primary application instance written to a first log data structure associated with the primary computing device;
    store the event data in a second log data structure associated with the standby computing system and a shadow application instance, wherein the primary application instance and shadow application instance are instances of a same application;
    update a state of the shadow application instance by replaying events in the second log associated with the shadow application instance to thereby bring a state of the shadow application instance to a consistent state with the primary application instance;
    relocate the primary application instance to the standby computing system using the shadow application instance in response to a failure of the primary application instance; and
    synchronize a state of the shadow application instance with a state of the primary application instance prior to receiving event data from the primary computing device by:
        receiving application data for the primary application instance from the topologically remotely located primary computing device;
        receiving an application checkpoint comprising checkpoint metadata that represents a same point in time as the copy of the application data; and
        initializing the shadow application instance on the standby computing system using the application data and checkpoint metadata.

2. The standby computing system of claim 1, wherein the instructions cause the processor to store event data received subsequent to the receiving the log switch event message to a third log data structure associated with the shadow application instance.

3. The standby computing system of claim 2, wherein the instructions cause the processor to relocate the primary application instance to the standby computing system by:
    detecting a failure of the primary application instance on the primary computing device; and
    replaying events in the third log data structure in response to detecting the failure of the primary application instance.

4. The standby computing system of claim 1, wherein the primary computing device and standby computing system have a same virtual network address, and wherein input and output sockets of the primary application instance are enabled and only input sockets of the shadow application instance are enabled prior to relocating the primary application instance.

5. The standby computing system of claim 4, wherein the instructions further cause the processor to:
    detect a failure of the primary application instance on the primary computing device;
    replay events in the third log data structure in response to detecting the failure of the primary application instance to thereby bring the shadow application instance to a consistent state with the primary application instance just prior to the detected failure of the primary application instance; and
    enable output sockets of the shadow application instance in response to detecting the failure of the primary application instance.

6. The standby computing system of claim 1, wherein the primary computing device automatically writes the event data for events occurring in the primary application instance in the first log data structure and automatically copies the event data to the second log data structure as the event data is written to the first log data structure.

7. The standby computing system of claim 1, wherein automatically receiving the event data comprises receiving the event data via a peer-to-peer remote copy operation executed by the primary computing device.

8. A method, in a standby computing device, for providing a shadow application instance for relocation of a primary application instance, comprising:

automatically receiving, from a primary computing device topologically remotely located from the standby computing device, event data for a primary application instance written to a first log data structure associated with the primary computing device;

storing the event data in a second log data structure associated with the standby computing device and a shadow application instance, wherein the primary application instance and shadow application instance are instances of a same application;

updating a state of the shadow application instance by replaying events in the second log associated with the shadow application instance to thereby bring a state of the shadow application instance to a consistent state with the primary application instance; and     relocating the primary application instance to the standby computing device using the shadow application instance in response to a failure of the primary application and     synchronizing a state of the shadow application instance with a state of the primary application instance prior to receiving event data from the primary computing device by:

receiving application data for the primary application instance from the topologically remotely located primary computing device;

receiving an application checkpoint comprising checkpoint metadata that represents a same point in time as the copy of the application data; and         initializing the shadow application instance on the standby computing system using the application data and checkpoint metadata.

9. The method of claim 8, further comprising:

storing event data received subsequent to the receiving the log switch event message to a third log data structure associated with the shadow application instance.

10. The method of claim 9, wherein relocating the primary application instance to the standby computing device comprises:

detecting a failure of the primary application instance on the primary computing device; and     replaying events in the third log data structure in response to detecting the failure of the primary application instance.

11. The method of claim 8, wherein the primary computing device and standby computing device have a same virtual network address, and wherein input and output sockets of the primary application instance are enabled and only input sockets of the shadow application instance are enabled prior to relocating the primary application instance.

12. The method of claim 11, wherein relocating the primary application instance comprises:

detecting a failure of the primary application instance on the primary computing device;

replaying events in the third log data structure in response to detecting the failure of the primary application instance to thereby bring the shadow application instance to a consistent state with the primary application instance just prior to the detected failure of the primary application instance; and     enabling output sockets of the shadow application instance in response to detecting the failure of the primary application instance.

13. The method of claim 8, wherein the primary computing device automatically writes the event data for events occurring in the primary application instance in the first log data structure and automatically copies the event data to the second log data structure as the event data is written to the first log data structure.

14. The method of claim 8, wherein automatically receiving the event data comprises receiving the event data via a peer-to-peer remote copy operation executed by the primary computing device.

\* \* \* \* \*